US012123368B2

(12) United States Patent
Ikeda et al.

(10) Patent No.: US 12,123,368 B2
(45) Date of Patent: Oct. 22, 2024

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Yuto Ikeda, Okazaki (JP); Koji Umezawa, Susono (JP); Makoto Yamazaki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/542,049

(22) Filed: Dec. 15, 2023

(65) Prior Publication Data

US 2024/0200501 A1 Jun. 20, 2024

(30) Foreign Application Priority Data

Dec. 20, 2022 (JP) ................................ 2022-203312

(51) Int. Cl.

*F02D 41/00* (2006.01)
*F02D 19/02* (2006.01)
*F02D 41/30* (2006.01)
*F02D 43/04* (2006.01)

(52) U.S. Cl.

CPC ....... *F02D 41/0027* (2013.01); *F02D 19/021* (2013.01); *F02D 41/0002* (2013.01); *F02D 41/30* (2013.01); *F02D 43/04* (2013.01)

(58) Field of Classification Search

CPC ............... F02D 41/0027; F02D 19/021; F02D 41/0002; F02D 41/30; F02D 43/04

See application file for complete search history.

(56) References Cited

U.S. PATENT DOCUMENTS 4,759,329 A 7/1988 Nobuo et al.

FOREIGN PATENT DOCUMENTS

JP 2644732 B2 8/1997
JP 09317446 A * 12/1997 ........... F01N 13/009
JP 2006299890 A * 11/2006 ............ F02M 26/05

OTHER PUBLICATIONS

Machine Translation of JP2006299890A PDF File Name: "JP2006299890A_Machine_Translation.pdf".*
Machine Translation of JP09317446A PDF File Name: "JP09317446A_Machine_Translation.pdf".*

* cited by examiner

*Primary Examiner* — Grant Moubry
*Assistant Examiner* — Ruben Picon-Feliciano
(74) *Attorney, Agent, or Firm* — Finnegan, Henderson, Farabow, Garrett, and Dunner, LLP

(57) ABSTRACT

A first condition is set to such a condition of a fuel injection amount of a fuel injection valve and an opening degree of a throttle valve that an air excess ratio in a cylinder becomes greater than or equal to a prescribed value set as a value greater than 1.2 while satisfying a target output of an internal combustion engine. A second condition is set to such a condition of the fuel injection amount and the opening degree of the throttle valve that the air excess ratio in the cylinder becomes 1 or less while satisfying the target output of the internal combustion engine. A controller of the internal combustion engine is configured to obtain the first and second operating conditions that correspond to the target output, and select one of the operating conditions in accordance with the operating situation of the internal combustion engine.

6 Claims, 2 Drawing Sheets

CONTROLLER AND CONTROL METHOD FOR INTERNAL COMBUSTION ENGINE

BACKGROUND

1. Field

The present disclosure relates to a controller and a control method for an internal combustion engine.

2. Description of Related Art

An internal combustion engine disclosed in Japanese Patent No. 2644732 includes a fuel injection valve and a throttle valve. The fuel injection valve injects fuel. The throttle valve adjusts an intake air amount. A controller for the internal combustion engine controls the internal combustion engine while variously changing a target air-fuel ratio. At that time, the controller controls the internal combustion engine such that the same output can be obtained for the same accelerator operation amount even if the target air-fuel ratio is changed.

In an internal combustion engine using hydrogen gas as fuel, it is desirable to reduce NOx contained in exhaust gas. In an internal combustion engine using hydrogen gas as fuel, when various air-fuel ratios are set according to the situation as in Japanese Patent No. 2644732, NOx contained in the exhaust gas may increase depending on the air-fuel ratio. Therefore, a technique capable of reducing NOx while achieving the target output is desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. The internal combustion engine includes a cylinder, a fuel injection valve that supplies hydrogen gas into the cylinder, and a throttle valve that adjusts an intake air amount. A first operating condition is set to such a condition of a fuel injection amount of the fuel injection valve and an opening degree of the throttle valve that an air excess ratio in the cylinder becomes greater than or equal to a prescribed value predetermined as a value greater than 1.2 while satisfying a target output of the internal combustion engine. A second operating condition is set to such a condition of the fuel injection amount and the opening degree that the air excess ratio in the cylinder becomes 1 or less while satisfying the target output. The controller is configured to execute an obtaining process of obtaining the first operating condition and the second operating condition that correspond to the target output, and a selecting process of selecting one of the first operating condition and the second operating condition obtained in the obtaining process according to an operating situation of the internal combustion engine.

In another general aspect, a control method for an internal combustion engine is provided. The internal combustion engine includes a cylinder, a fuel injection valve that supplies hydrogen gas into the cylinder, and a throttle valve that adjusts an intake air amount. A first operating condition is set to such a condition of a fuel injection amount of the fuel injection valve and an opening degree of the throttle valve that an air excess ratio in the cylinder becomes greater than or equal to a prescribed value predetermined as a value greater than 1.2 while satisfying a target output of the internal combustion engine. A second operating condition is set to such a condition of the fuel injection amount and the opening degree that the air excess ratio in the cylinder becomes 1 or less while satisfying the target output. The control method includes obtaining the first operating condition and the second operating condition that correspond to the target output, and selecting one of the first operating condition and the second operating condition obtained in the obtaining in accordance with an operating situation of the internal combustion engine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a controller for an internal combustion engine according to one embodiment will be described with reference to the drawings.

Schematic Configuration of Internal Combustion Engine

Figure 1:
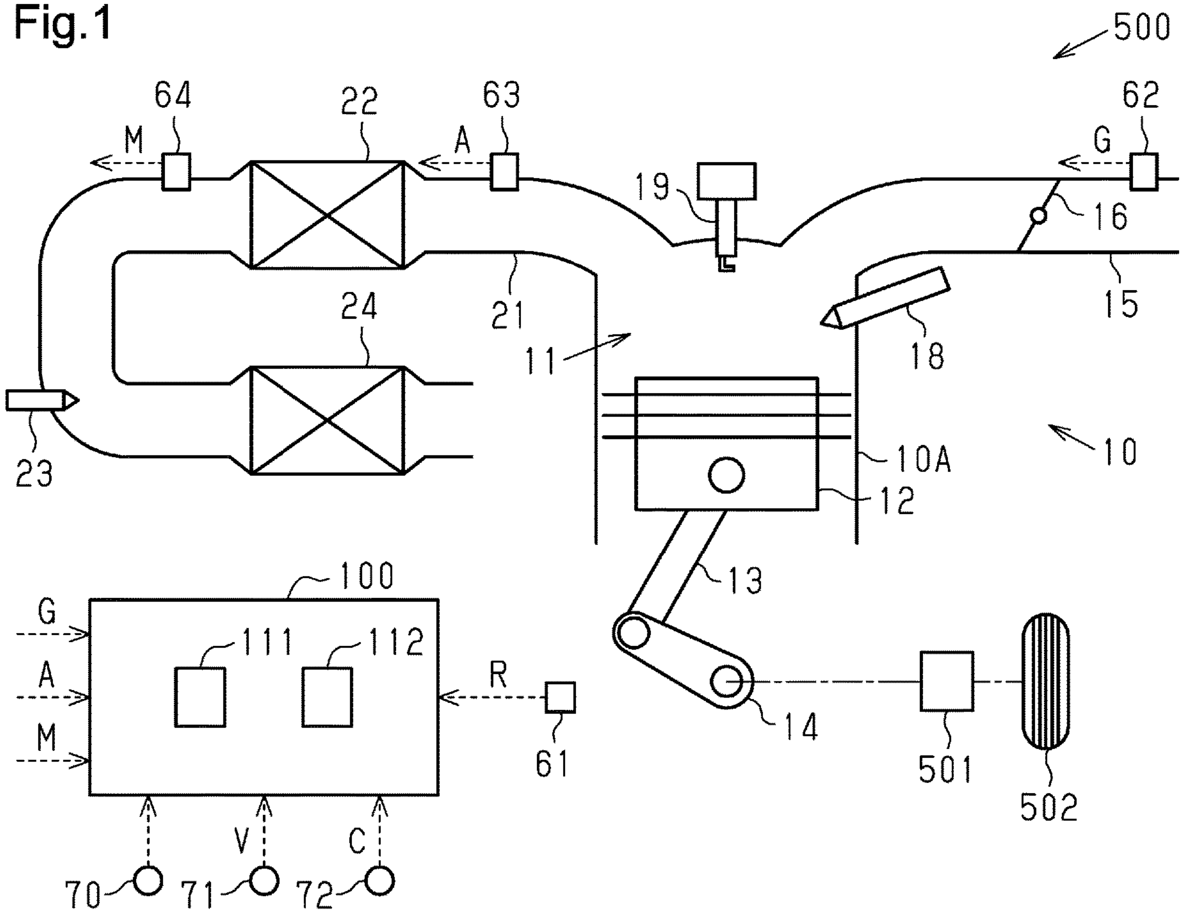
FIG. 1 is a schematic configuration diagram of an internal combustion engine.

A vehicle 500 includes an internal combustion engine 10. The internal combustion engine 10 is a drive source of the vehicle 500. The internal combustion engine 10 includes an engine body 10A, cylinders 11, pistons 12, connecting rods 13, and a crankshaft 14. In FIG. 1, only one of the cylinders 11 is illustrated. The same applies to the pistons 12 and the connecting rods 13. The piston 12 and the connecting rod 13 are provided for each cylinder 11. The number of the cylinders 11 is, for example, four.

The cylinder 11 is a space defined by the engine body 10A. The cylinder 11 is a space for combusting an air-fuel mixture of fuel and intake air. The piston 12 is located in the cylinder 11. The piston 12 reciprocates in the cylinder 11. The piston 12 is coupled to the crankshaft 14 via the connecting rod 13. The crankshaft 14 rotates in accordance with the reciprocation of the piston 12. The crankshaft 14 is an output shaft of the internal combustion engine 10. The crankshaft 14 is connected to a driven wheel 502 via an automatic transmission 501, a differential, and the like.

The internal combustion engine 10 includes fuel injection valves 18. In FIG. 1, only one of the fuel injection valves 18 is illustrated. The fuel injection valve 18 is provided for each cylinder 11. The fuel injection valve 18 injects hydrogen gas as fuel. The fuel injection valve 18 directly supplies fuel into the cylinder 11 without passing the fuel through an intake passage 15 described later.

The internal combustion engine 10 includes ignition plugs 19. In FIG. 1, only one of the ignition plugs 19 is illustrated. The ignition plug 19 is provided for each cylinder 11. The tip of the ignition plug 19 is located in the cylinder 11. The ignition plug 19 ignites the air-fuel mixture in the cylinder 11.

The internal combustion engine 10 includes an intake passage 15 and a throttle valve 16. The intake passage 15 is a passage for conducting intake air into each cylinder 11. The intake passage 15 is connected to each cylinder 11. The throttle valve 16 is located in the middle of the intake passage 15. The opening degree of the throttle valve 16 can be adjusted. A throttle opening degree D, which is the opening degree of the throttle valve 16, can be changed from a fully closed position, which is the minimum opening degree, to a fully opened position, which is the maximum opening degree. An intake air amount G changes according to the throttle opening degree D. That is, the throttle valve 16 adjusts the intake air amount G.

The internal combustion engine 10 includes an exhaust passage 21, an oxidation catalyst 22, a urea water injection valve 23, and a selective reduction catalyst (hereinafter, referred to as an SCR catalyst 24). The exhaust passage 21 is a passage for discharging exhaust gas from each cylinder 11. The exhaust passage 21 is connected to each cylinder 11. The oxidation catalyst 22 is located in the middle of the exhaust passage 21. The oxidation catalyst 22 oxidizes components contained in the exhaust gas. The urea water injection valve 23 is located on the downstream side of the oxidation catalyst 22 in the exhaust passage 21. The urea water injection valve 23 injects urea water into the exhaust passage 21. The SCR catalyst 24 is located on the downstream side of the urea water injection valve 23 in the exhaust passage 21. The SCR catalyst 24 uses ammonia gas derived from urea water injected by the urea water injection valve 23 as a reducing agent to reduce NOx (nitrogen oxide) contained in the exhaust gas into nitrogen and water. That is, the SCR catalyst 24 purifies NOx in the exhaust gas.

The internal combustion engine 10 includes a crank position sensor 61, an air flow meter 62, an air-fuel ratio sensor 63, and a temperature sensor 64. The crank position sensor 61 is located in the vicinity of the crankshaft 14. The crank position sensor 61 detects a rotational position R of the crankshaft 14. The air flow meter 62 is located on the upstream side of the throttle valve 16 in the intake passage 15. The air flow meter 62 detects an intake air amount G. The air-fuel ratio sensor 63 is located on the upstream side of the oxidation catalyst 22 in the exhaust passage 21. The air-fuel ratio sensor 63 detects an air-fuel ratio A of the exhaust gas discharged from the cylinder 11. In the present embodiment, the air-fuel ratio A detected by the air-fuel ratio sensor 63 is used as an air-fuel ratio A in the cylinder 11. The temperature sensor 64 is located between the oxidation catalyst 22 and the urea water injection valve 23. The temperature sensor 64 detects a temperature M of the exhaust gas flowing between the oxidation catalyst 22 and the urea water injection valve 23.

The vehicle 500 includes an ignition switch 70, a vehicle speed sensor 71, and an accelerator sensor 72. The ignition switch 70 is a switch for an occupant to instruct starting of the internal combustion engine 10. The ignition switch 70 is turned on or off according to the operation of the occupant. The vehicle speed sensor 71 detects the traveling speed of the vehicle 500 as a vehicle speed V. The accelerator sensor 72 detects an operation amount of an accelerator pedal in the vehicle 500 as an accelerator operation amount C.

Schematic Configuration of Controller

The vehicle 500 includes a controller 100. The controller 100 may include one or more processors that perform various processes according to computer programs (software). The controller 100 may be circuitry including one or more dedicated hardware circuits such as application specific integrated circuits (ASICs) that execute at least part of various processes, or a combination thereof. The processor includes a CPU 111 and a memory 112 such as a RAM and a ROM. The memory 112 stores program code or instructions configured to cause the CPU 111 to execute processes. The memory 112, which is a computer-readable medium, includes any type of media that are accessible by general-purpose computers and dedicated computers. The memory 112 includes a nonvolatile memory, which can be electrically rewritten. The controller 100 executes various types of control and processes, which will be discussed below, by causing the CPU 111 to execute programs stored in the memory 112.

The controller 100 receives a signal from the ignition switch 70. While the ignition switch 70 is on, the controller 100 repeatedly receives detection signals from various sensors in the vehicle 500. Specifically, the controller 100 receives a detection signal for each of the following parameters.

Vehicle speed V detected by vehicle speed sensor 71
Accelerator operation amount C detected by accelerator sensor 72
Rotational position R of crankshaft 14 detected by crank position sensor 61
Intake air amount G detected by air flow meter 62
Air-fuel ratio A detected by air-fuel ratio sensor 63
Temperature M of exhaust gas detected by temperature sensor 64

The controller 100 controls the internal combustion engine 10. While the ignition switch 70 is turned on, the controller 100 repeatedly calculates a target output PQ, which is a target value of the output P of the internal combustion engine 10, based on the vehicle speed V and the accelerator operation amount C. The target output PQ is the output P of the internal combustion engine 10 necessary for generating the driving force of the vehicle 500 requested by the occupant through the operation of the accelerator pedal. After calculating the target output PQ, the controller 100 operates various devices to be operated, such as the throttle valve 16, the fuel injection valve 18, and the ignition plug 19 such that the actual output P of the internal combustion engine 10 agrees with the target output PQ. The output P of the internal combustion engine 10 is the product of an engine torque TK, which is the torque of the internal combustion engine 10, and an engine rotational speed NE, which is the rotational speed of the crankshaft 14. When controlling the internal combustion engine 10, strictly speaking, the controller 100 calculates a target value of the engine torque TK and a target value of the engine rotational speed NE based on the target output PQ. At this time, the controller 100 calculates the optimum combination of the engine torque TK and the engine rotational speed NE in consideration of, for example, exhaust performance and fuel consumption performance. Then, the controller 100 operates each of the devices to be operated such that the calculated target value of the engine torque TK agrees with the actual engine torque TK, and the calculated target value of the engine rotational speed NE agrees with the actual engine rotational speed NE. Hereinafter, the calculation of the target values of the engine torque TK and the engine rotational speed NE will not be described in detail.

The controller 100 repeatedly calculates various parameters related to the state of the internal combustion engine 10. For example, the controller 100 calculates the engine rotational speed NE based on the rotational position R of the crankshaft 14. In addition, the controller 100 calculates the temperature of the SCR catalyst 24 based on the temperature M of the exhaust gas. The controller 100 calculates an air excess ratio λ in the cylinder 11 based on the air-fuel ratio A in the cylinder 11. The air excess ratio λ represents the ratio of the actual air-fuel ratio A to the stoichiometric air-fuel ratio AS. That is, the combustion of the internal combustion engine 10 when the air excess ratio λ is 1.0 is stoichiometric combustion at the stoichiometric air-fuel ratio AS. The combustion of the internal combustion engine 10 when the air excess ratio λ is greater than 1.0 is lean combustion at the air-fuel ratio A on the leaner side than the stoichiometric air-fuel ratio AS. The combustion of the internal combustion engine 10 when the air excess ratio λ is less than 1.0 is rich combustion at the air-fuel ratio A on the richer side than the stoichiometric air-fuel ratio AS.

Outline of Specific Control

In the internal combustion engine 10, NOx is generated in the process of a combustion reaction of hydrogen gas. When the temperature of the SCR catalyst 24 is higher than or equal to the activation temperature, the SCR catalyst 24 purifies NOx generated by combustion, thereby suppressing NOx emission to the outside air. On the other hand, during a period from the start of the internal combustion engine 10 to the completion of the warm-up of the SCR catalyst 24, the SCR catalyst 24 cannot sufficiently exhibit the NOx purification ability. The controller 100 is capable of executing a specific control as control for the warm-up period of the SCR catalyst 24.

The controller 100 is capable of executing a first obtaining process, a second obtaining process, and a selecting process as part of the specific control. In the first obtaining process, the controller 100 calculates a first operating condition according to the target output PQ. The first operating condition is such a condition of a fuel injection amount F of the fuel injection valve 18, a throttle opening degree D, and an ignition timing Y of the ignition plug 19 that the air excess ratio λ in the cylinder 11 becomes greater than or equal to a first set value U1 while satisfying the target output PQ of the internal combustion engine 10. The first set value U1 will be described later. Calculating the first operating condition corresponds to obtaining the first operating condition. The first set value U1 corresponds to a prescribed value.

In the second obtaining process, the controller 100 calculates a second operating condition according to the target output PQ. The second operating condition is such a condition of the fuel injection amount F, the throttle opening degree D, and the ignition timing Y that the air excess ratio λ in the cylinder 11 becomes less than or equal to a second set value U2 while satisfying the target output PQ of the internal combustion engine 10. Calculating the second operating condition corresponds to obtaining the second operating condition.

In the selecting process, the controller 100 selects one of the first operating condition, calculated in the first obtaining process, and the second operating condition, calculated in the second obtaining process, according to the operating situation of the internal combustion engine 10. In the present embodiment, the controller 100 selects the first operating condition when the target output PQ is less than or equal to a predetermined determination value PN, and selects the second operating condition when the target output PQ is greater than the determination value PN.

The controller 100 stores the first set value U1, the second set value U2, and the determination value PN in advance.

First Set Value and Second Set Value

Figure 2:
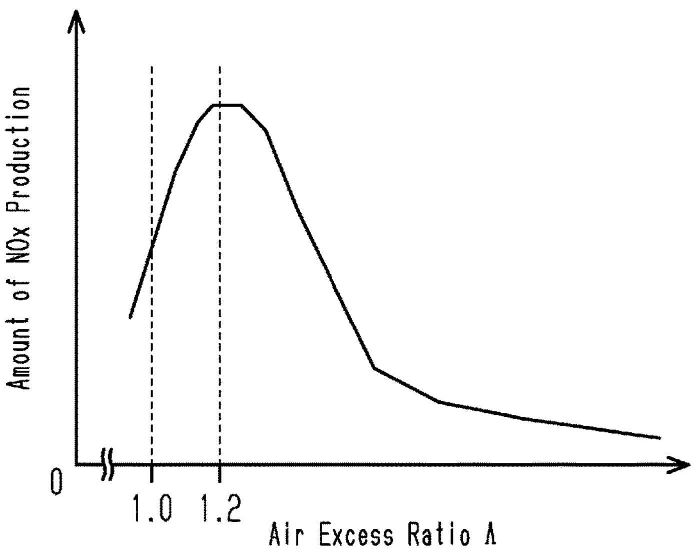
FIG. 2 is a graph illustrating a relationship between an air excess ratio and an amount of NOx production.

The first set value U1 and the second set value U2 are determined in relation to the amount of NOx produced by combustion of hydrogen gas. As illustrated in FIG. 2, the amount of NOx production in the internal combustion engine 10 increases or decreases according to the air excess ratio λ. The amount of NOx production in FIG. 2 represents the weight ratio of NOx in the exhaust gas. The amount of NOx production changes as follows with respect to the air excess ratio λ. An example will now be described in which the air excess ratio λ is a positive first value less than 1.0. As the air excess ratio λ increases from the first value toward 1.0, the amount of NOx production gradually increases. When the air excess ratio λ further increases beyond 1.0, the amount of NOx production turns from an increase to a decrease around when the air excess ratio λ exceeds 1.2. As the air excess ratio λ further increases, the amount of NOx production gradually decreases. Thus, the amount of NOx production is maximized when the air excess ratio λ is around 1.2. Hereinafter, the air excess ratio λ at which the amount of NOx production is maximized is referred to as a maximum excess ratio.

The upper limit value of the amount of NOx production allowed when the temperature of the SCR catalyst 24 is in an unwarmed state in which the temperature does not reach the activation temperature is referred to as an upper limit NOx amount. The upper limit NOx amount is predetermined such that the NOx emission amount to the outside air satisfies the regulations. In the range of the air excess ratio λ greater than the maximum excess ratio, when the air excess ratio λ is greater than or equal to a first specified value, it is known through experiments or simulations that the amount of NOx production is less than or equal to the upper limit NOx amount. That is, the first specified value is a minimum value that allows the amount of NOx production to be less than or equal to the upper limit NOx amount in the range of the air excess ratio λ greater than the maximum excess ratio. In view of the maximum excess ratio, the first specified value is greater than 1.2. The first set value U1 related to the first operating condition is predetermined as a value greater than the first specified value. The first set value U1 is, for example, 2.5.

Experiments or simulations have shown that when the air excess ratio λ is less than or equal to a second specified value in the range of the air excess ratio λ less than the maximum excess ratio, the amount of NOx production is less than or equal to the upper limit NOx amount. That is, the second specified value is a maximum value that allows the amount of NOx production to be less than or equal to the upper limit NOx amount in the range of the air excess ratio λ less than the maximum excess ratio. The second set value U2 related to the second operating condition is predetermined as a value less than the second specified value. The second set value U2 is set to a value less than 1.0. The second set value U2 is, for example, 0.9. In the present embodiment, the amount of NOx production when the air excess ratio λ is the second set value U2 is greater than the amount of NOx production when the air excess ratio λ is the first set value U1.

Determination Value

Due to the setting of the first set value U1, the internal combustion engine 10 is caused to perform lean combustion under the first operating condition. On the other hand, due to setting of the second set value U2, the internal combustion engine 10 is caused to perform rich combustion under the second operating condition. In this context, the second operating condition achieves a greater output P than the first operating condition. The determination value PN serving as the threshold for determination in the selecting process is predetermined, for example, in an experiment or a simulation as a value slightly less than the maximum value of the output P that can be achieved by the internal combustion engine 10 when the air excess ratio λ is set to the first set value U1.

Specific Processing Procedure of Specific Control

When the ignition switch 70 is switched on, the controller 100 repeatedly executes the specific control on condition that the temperature of the SCR catalyst 24 is lower than or equal to the activation temperature. When the temperature of the SCR catalyst 24 reaches the activation temperature, the controller 100 ends the specific control at that time. When ending the specific control, the controller 100 shifts to normal control of the internal combustion engine 10. The controller 100 stores the activation temperature of the SCR catalyst 24 in advance.

Figure 3:
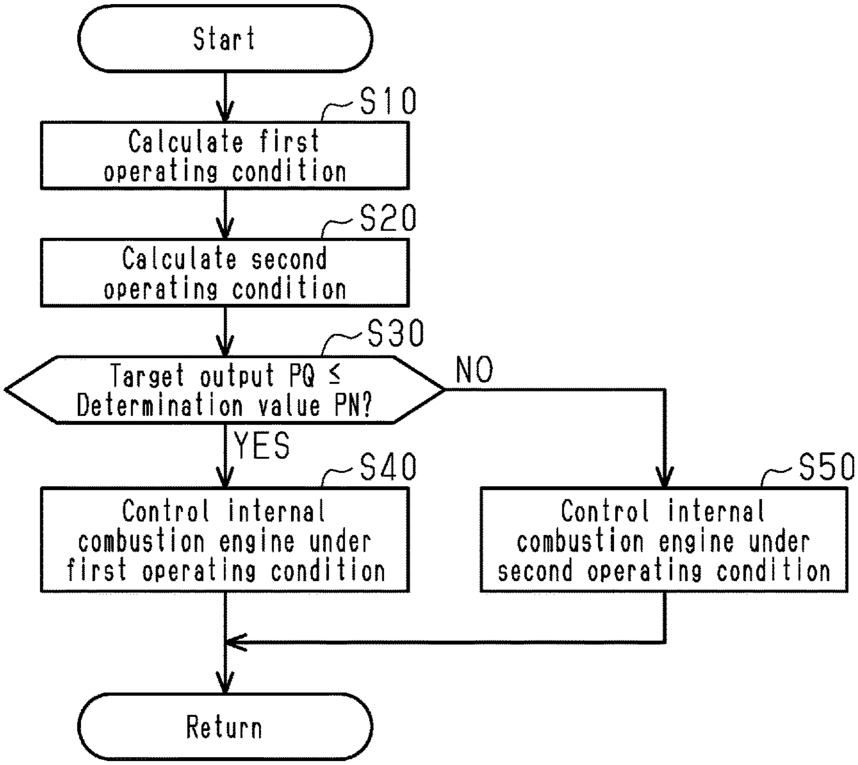
FIG. 3 is a flowchart illustrating a processing procedure of specific control.

As illustrated in FIG. 3, when starting the specific control, the controller 100 first executes the process of step S10. In step S10, the controller 100 refers to the current target output PQ. Then, the controller 100 calculates the fuel injection amount F, the throttle opening degree D, and the ignition timing Y necessary for setting the air excess ratio λ in the cylinder 11 to the first set value U1 or greater while satisfying the target output PQ. The value of each parameter calculated by the controller 100 in step S10 corresponds to the first operating condition that is such a condition of the fuel injection amount F, the throttle opening degree D, and the ignition timing Y that the air excess ratio λ becomes the first set value U1 or greater while satisfying the target output PQ. The fuel injection amount F, the throttle opening degree D, and the ignition timing Y change according to the target output PQ. That is, in step S10, the controller 100 calculates the first operating condition according to the target output PQ. The fuel injection amount F may be calculated for each of the fuel injection valves 18.

When calculating the first operating condition, the controller 100 calculates the throttle opening degree D as the full opening among the three parameters of the fuel injection amount F, the throttle opening degree D, and the ignition timing Y. Then, the controller 100 calculates the fuel injection amount F and the ignition timing Y necessary for achieving the target output PQ. At this time, the controller 100 calculates the combination of the fuel injection amount F and the ignition timing Y such that the air excess ratio λ becomes a value as large as possible on the assumption that the air excess ratio λ becomes the first set value U1 or greater. That is, the controller 100 gives priority to reducing the amount of NOx production. For example, the controller 100 calculates an optimum combination for each parameter using various maps stored in advance.

In the process of step S10, when the current target output PQ is greater than the determination value PN, the controller 100 sets a provisional value for each of the fuel injection amount F, the throttle opening degree D, and the ignition timing Y. The provisional value indicates that there is no valid value. After executing the process of step S10, the controller 100 advances the process to step S20. The process in step S10 is the first obtaining process.

In step S20, the controller 100 calculates the fuel injection amount F, the throttle opening degree D, and the ignition timing Y necessary to make the air excess ratio λ in the cylinder 11 less than or equal to the second set value U2 while satisfying the target output PQ referred to in step S10. The value of each parameter calculated by the controller 100 in step S20 corresponds to the second operating condition that is such a condition of the fuel injection amount F, the throttle opening degree D, and the ignition timing Y that the air excess ratio λ becomes less than or equal to the second set value U2 while satisfying the target output PQ. As described above, the fuel injection amount F, the throttle opening degree D, and the ignition timing Y change according to the target output PQ. That is, in step S20, the controller 100 calculates the second operating condition according to the target output PQ. The controller 100 calculates a combination of the fuel injection amount F, the throttle opening degree D, and the ignition timing Y that achieves the target output PQ, such that the air excess ratio λ becomes a value as small as possible in the range in which the air excess ratio λ is greater than or equal to the allowable value and less than or equal to the second set value U2. At this time, the controller 100 calculates the values of these parameters such that the throttle opening degree D becomes an opening degree less than the full opening degree. The allowable value is predetermined from the viewpoint of preventing pre-ignition, for example. The pre-ignition is a phenomenon in which the air-fuel mixture is ignited before ignition is performed by the ignition plug 19. After executing the process of step S20, the controller 100 advances the process to step S30. The process in step S20 is the second obtaining process.

In step S30, the controller 100 determines whether the target output PQ referred to in step S10 is less than or equal to the determination value PN. When the target output PQ is less than or equal to the determination value PN (step S30: YES), the controller 100 selects the first operating condition as the operating condition for controlling the internal combustion engine 10. Then, the controller 100 advances the process to step S40.

In step S40, the controller 100 controls the internal combustion engine 10 under the first operating condition. That is, the controller 100 controls each ignition plug 19 such that ignition is performed at the ignition timing Y calculated in step S10. In addition, the controller 100 controls each fuel injection valve 18 such that the fuel injection amount F calculated in step S10 is injected. In addition, the controller 100 controls the throttle valve 16 such that the throttle opening degree D calculated in step S10 is obtained. The controller 100 controls the internal combustion engine 10 based on the first operating condition over a specified control period determined in advance. Thereafter, the controller 100 temporarily ends the series of processes of the specific control. Then, the controller 100 executes the process of step S10 again.

On the other hand, in step S30, when the target output PQ is greater than the determination value PN (step S30: NO), the controller 100 selects the second operating condition as the operating condition for controlling the internal combustion engine 10. Then, the controller 100 advances the process to step S50.

In step S50, the controller 100 controls the internal combustion engine 10 under the second operating condition. That is, the controller 100 controls each target device based on the ignition timing Y, the throttle opening degree D, and the fuel injection amount F calculated in step S20. As in step S40, the controller 100 continues the process of step S50 over a specified control period. Thereafter, the controller 100 temporarily ends the specific control. Then, the controller 100 executes the process of step S10 again. The processes of steps S30, S40, and S50 are selecting processes.

Operation of Embodiment

An example illustrated in FIG. 4 will now be described in which the ignition switch 70 is turned on at time T1. Also, the internal combustion engine 10 is started at time T1. The target output PQ of the internal combustion engine 10 is less than or equal to the determination value PN (step S30: YES) from time T1 to time T2. In this case, the controller 100 controls the internal combustion engine 10 under the first operating condition (step S40). That is, as illustrated in part (b) of FIG. 4, the controller 100 controls the internal combustion engine 10 by setting the air excess ratio λ to the first set value U1 or greater. As a result, the controller 100 controls the internal combustion engine 10 while avoiding the region of the air excess ratio λ in which the amount of NOx production increases. By controlling the internal combustion engine 10 while avoiding the air excess ratio λ at which the amount of NOx production increases, the amount of NOx production is maintained to be small as illustrated in part (c) of FIG. 4. As illustrated in part (b) of FIG. 4, the controller 100 fully opens the throttle opening degree D under the first operating condition. As a result, a large amount of high-temperature exhaust gas reaches the SCR catalyst 24. Therefore, warm-up of the SCR catalyst 24 readily proceeds.

Another example will now be described in which the target output PQ of the internal combustion engine 10 becomes greater than the determination value PN at time T2 (step S30: NO). At this time, the warm-up of the SCR catalyst 24 is not completed. In this case, the controller 100 controls the internal combustion engine 10 under the second operating condition (step S50). That is, as illustrated in part (b) of FIG. 4, the controller 100 controls the internal combustion engine 10 by setting the air excess ratio λ to the second set value U2 or less. As a result, the controller 100 controls the internal combustion engine 10 while avoiding the region of the air excess ratio λ in which the amount of NOx production increases.

Figure 4:
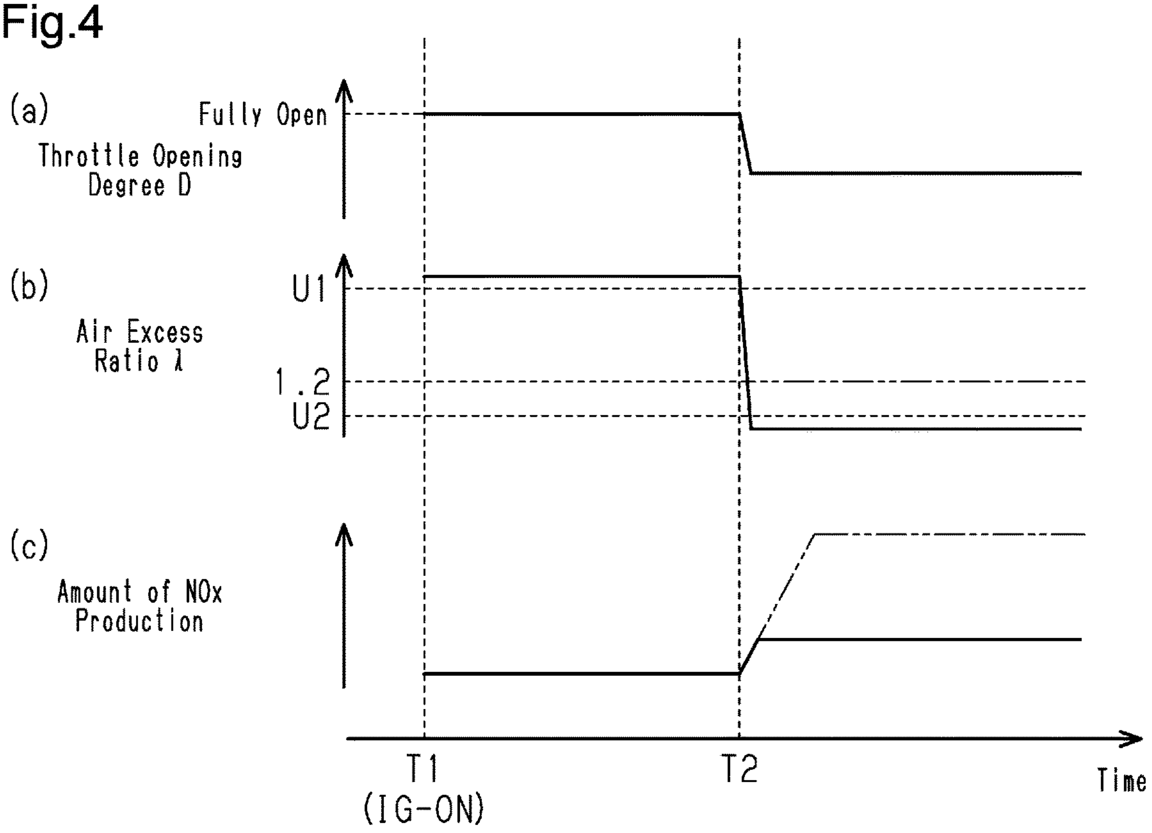
FIG. 4 is a timing diagram illustrating an example of transition of each parameter related to the specific control.

In order to reduce the air excess ratio λ to achieve the target output PQ after time T2, the air excess ratio λ is set to around 1.2 as indicated by a long-dash double-short-dash line in part (b) of FIG. 4. In this case, as indicated by a long-dash double-short-dash line in part (c) of FIG. 4, the amount of NOx production becomes excessively large.

On the other hand, when the internal combustion engine 10 is controlled under the second operating condition as in the present embodiment, the amount of NOx production can be kept small even after time T2 as indicated by the solid line in part (c) of FIG. 4. As described above, the second set value U2, which is the limit value of the air excess ratio λ according to the second operating condition, has a greater amount of NOx production than the first set value U1, which is the limit value of the air excess ratio λ according to the first operating condition. In this regard, when the internal combustion engine 10 is controlled under the second operating condition, the amount of NOx production can be greater than when the internal combustion engine 10 is controlled under the first operating condition. Therefore, under the second operating condition, the controller 100 sets the throttle opening degree D to an opening degree less than the full opening as illustrated in part (a) of FIG. 4. Therefore, the amount of exhaust gas is reduced. By reducing the amount of exhaust gas, the amount of NOx discharged to the outside of the internal combustion engine 10 through the exhaust passage 21 can be maintained to be small.

Advantages of Embodiment (1) The controller 100 controls the internal combustion engine 10 while avoiding the region of the air excess ratio λ in which the amount of NOx production increases during the execution of the specific control. As a result, the NOx emission amount to the outside air is reduced during the period in which the SCR catalyst 24 is in the unwarmed state. That is, in the present embodiment, the NOx emission amount to the outside air is reduced over the entire period of the warm-up of the SCR catalyst 24 while promoting the warm-up of the SCR catalyst 24 by the first operating condition or the like for fully opening the throttle opening degree D.

(2) The controller 100 selects the second operating condition when the target output PQ is relatively large during the execution of the specific control. As a result, the controller 100 causes the internal combustion engine 10 to perform rich combustion. Therefore, it is possible to prevent situations in which the target output PQ cannot be achieved due to prioritizing the reduction of NOx emissions.

Modifications

The above-described embodiment may be modified as follows. The above-described embodiments and the following modifications can be combined if the combined modifications remain technically consistent with each other.

The situation to be subjected to the specific control is not limited to a situation during the warm-up of the SCR catalyst 24. The specific control may be performed in any period during the operation of the internal combustion engine 10. The specific control may be performed from the beginning to the end during the operation of the internal combustion engine 10. As described in the above embodiment, in the specific control, the internal combustion engine 10 is controlled while avoiding the region of the air excess ratio λ in which the amount of NOx production increases. Therefore, if the specific control is performed, the amount of NOx production and thus the NOx emission amount to the outside air is suppressed not only during the warm-up of the SCR catalyst 24.

The first set value U1 is not limited to the example of the above embodiment. The first set value U1 may be a value greater than 1.2. The first set value U1 may be any value that is effective from the viewpoint of suppressing the NOx emission amount to the outside air. An optimum value may be appropriately set according to a situation in which the specific control is performed.

The second set value U2 is not limited to the example of the above embodiment. The second set value U2 may be a value of 1.0 or less. Similarly to the first set value U1, the second set value U2 may be set to any value that is effective from the viewpoint of suppressing the NOx emission amount to the outside air.

The first operating condition is not limited to the example described in step S10 of the above embodiment. The first operating condition may be a condition of the fuel injection amount F and the throttle opening degree D such that the air excess ratio λ in the cylinder 11 becomes greater than or equal to the first set value U1 while satisfying the target output PQ of the internal combustion engine 10. For example, the throttle opening degree D may be set to an opening degree less than the full opening under the first operating condition. In addition, it is not essential to include the ignition timing Y in the first operating condition. In addition, the first operating condition is not limited to a combination of values of the fuel injection amount F and the throttle opening degree D, and may be a range of values of the fuel injection amount F and the throttle opening degree D.

The second operating condition is not limited to the example described in step S20 of the above embodiment. The second operating condition may be a condition of the fuel injection amount F and the throttle opening degree D such that the air excess ratio λ in the cylinder 11 becomes less than or equal to the second set value U2 while satisfying the target output PQ of the internal combustion engine 10. For example, the throttle opening degree D may be fully opened under the second operating condition. Similarly to the first operating condition, it is not essential to include the ignition timing Y in the second operating condition. Similarly to the first operating condition, the second operating condition may define a range of values of the fuel injection amount F and the throttle opening degree D.

The manner of determining the determination value PN is not limited to the example of the above embodiment. If the determination value PN is determined as a value with which it can be determined whether the target output PQ can be achieved under the first operating condition, the first operating condition can be selected for an opportunity to achieve the target output PQ. The determination value PN may be set to a value suitable for determining which one of the first operating condition and the second operating condition is to be selected according to a situation in which specific control is performed.

The manner of determining which one of the first operating condition and the second operating condition is selected is not limited to the example of the above embodiment using the determination value PN. Depending on the magnitude of the target output PQ, the target output PQ can be achieved under both the first operating condition and the second operating condition. For such a case, it is also conceivable to change the specific control to the following mode. That is, after performing the first obtaining process and the second obtaining process, the controller 100 performs the following as the selecting process. The controller 100 selects the second operating condition when a first specific condition is satisfied and when the target output PQ can be achieved under both the first operating condition and the second operating condition. Then, the controller 100 controls the internal combustion engine 10 under the second operating condition. The first specific condition is a condition that requires limiting the engine rotational speed NE to be less than a prescribed rotational speed. Lean combustion is performed under the first operating condition, whereas stoichiometric combustion or rich combustion is performed under the second operating condition. Therefore, even if the same target output PQ is achieved under the first operating condition and the second operating condition, when the internal combustion engine 10 is controlled under the second operating condition, the engine torque TK becomes greater than when the internal combustion engine 10 is controlled under the first operating condition. Then, the engine rotational speed NE decreases. Therefore, in a scene in which the engine rotational speed NE is desired to be suppressed, it is effective to select the second operating condition as in the present modification.

An example of the first specific condition is that the vehicle speed Vis less than or equal to a prescribed vehicle speed. When the vehicle speed V is relatively low, for example, background noise such as road noise and wind roar is reduced. Under a situation in which the background noise is low, it is preferable to reduce the operation sound of the internal combustion engine 10 from the viewpoint of enhancing the quietness in the vehicle. Therefore, by setting the above contents as the first specific condition, it is possible to suppress the engine rotational speed NE and thus the operation sound of the internal combustion engine 10 under a situation in which the vehicle speed Vis low. When the above content is adopted as the first specific condition, the prescribed vehicle speed may be set to a vehicle speed V at which the background noise is considered to be reduced accordingly. In addition, the specified rotational speed may be set to a value at which the occupant is considered to be less likely to notice the operating sound of the internal combustion engine 10.

When the target output PQ can be achieved under both the first operating condition and the second operating condition, the following mode can also be adopted. That is, the controller 100 selects the first operating condition, in the selecting process, when a second specific condition is satisfied and when the target output PQ can be achieved under both the first operating condition and the second operating condition. The second specific condition is a condition for requesting to limit the engine torque TK to be less than a predetermined specified torque described above, even if the same target output PQ is achieved under the first operating condition and the second operating condition, when the internal combustion engine 10 is controlled under the first operating condition, the engine torque TK becomes less than when the internal combustion engine 10 is controlled under the second operating condition. Therefore, in a scene in which the engine torque TK is desired to be suppressed, it is effective to select the first operating condition as in the present modification.

An example of the second specific condition is that the internal combustion engine 10 is idling. The specified torque in this case may be set to an effective value from the viewpoint of improving the fuel consumption, for example.

The configuration of the internal combustion engine 10 is not limited to the example of the above embodiment. For example, the fuel injection valve 18 may be configured to supply fuel into the cylinder 11 via the intake passage 15. The internal combustion engine 10 may include the fuel injection valve 18 that supplies hydrogen gas into the cylinder 11 and the throttle valve 16 that adjusts the intake air amount G.

The overall configuration of the vehicle 500 is not limited to the example of the above embodiment. For example, the vehicle 500 may include a motor generator in addition to the internal combustion engine 10 as a drive source of the vehicle 500.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An internal combustion engine includes comprising:
a cylinder;
a fuel injection valve that supplies hydrogen gas into the cylinder, and;
a throttle valve that adjusts an intake air amount,; and
a controller, wherein the controller is configured to:
calculate a first operating condition in which a fuel injection amount of the fuel injection valve and an opening degree of the throttle valve result in an air excess ratio in the cylinder being greater than 1.2 while satisfying a target output of the internal combustion engine;
calculate a second operating condition in which the fuel injection amount of the fuel injection valve and the opening degree of the throttle valve result in the air excess ratio in the cylinder being 1 or less while satisfying the target output of the internal combustion engine;
calculate a third operating condition in which the fuel injection amount of the fuel injection valve and the opening degree of the throttle valve result in the air excess ratio in the cylinder falling within a range that is greater than 1 and less than or equal to 1.2, and an amount of NOx production is increased relative to an amount of NOx produced during the first and second operating conditions; and
select one of the first operating condition and the second operating condition according to an operating situation of the internal combustion engine, wherein the selection of one of the first operating condition and the second operating condition is given preference relative to a selection of the third operating condition.

2. The internal combustion engine according to claim 1, wherein
the controller is further configured to select the first operating condition when the target output of the internal combustion engine is less than or equal to a predetermined determination value, and select the second operating condition when the target output is greater than the determination value.

3. The internal combustion engine according to claim 1, wherein
the controller is further configured to select the second operating condition when a first specific condition is satisfied that requires limiting of a rotational speed of an output shaft of the internal combustion engine to be less than a prescribed rotational speed, and the target output can be achieved under both the first operating condition and the second operating condition.

4. The internal combustion engine according to claim 1, wherein
the controller is further configured to select the first operating condition when a second specific condition is satisfied that requires limiting of a torque of the internal combustion engine to be less than a prescribed torque, and the target output can be achieved under both the first operating condition and the second operating condition.

5. A control method for an internal combustion engine, wherein the internal combustion engine includes a cylinder, a fuel injection valve that supplies hydrogen gas into the cylinder, and a throttle valve that adjusts an intake air amount, the method comprising:
calculating a first operating condition in which a fuel injection amount of the fuel injection valve and an opening degree of the throttle valve result in an air excess ratio in the cylinder being greater than or equal to 1.2 while satisfying a target output of the internal combustion engine,
calculating a second operating condition in which the fuel injection amount and the opening degree result in the air excess ratio in the cylinder being 1 or less while satisfying the target output of the internal combustion engine,
calculating a third operating condition in which the fuel injection amount and the opening degree result in the air excess ratio in the cylinder falling within a range that is greater than 1 and less than or equal to 1.2, and an amount of NOx production is increased relative to an amount of NOx produced during the first and second operating conditions, and
selecting one of the first operating condition and the second operating condition in accordance with an operating situation of the internal combustion engine, wherein the selection of one of the first operating condition and the second operating condition is given preference relative to a selection of the third operating condition.

6. The internal combustion engine according to claim 1, further including an SCR catalyst that purifies NOx contained in the exhaust gas by reducing NOx into nitrogen and water using ammonia gas as a reducing agent, wherein the controller is further configured to calculate the first, second, and third operating conditions and select one of the first and second operating conditions during a warm-up period of the SCR catalyst.

* * * * *